J. H. VALENTINE.
Bee Hive.
No. 35,791. Patented July 1, 1862.
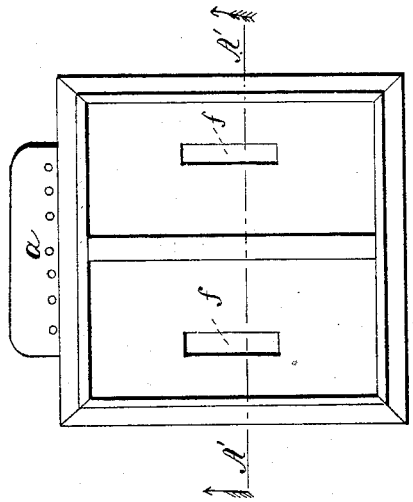
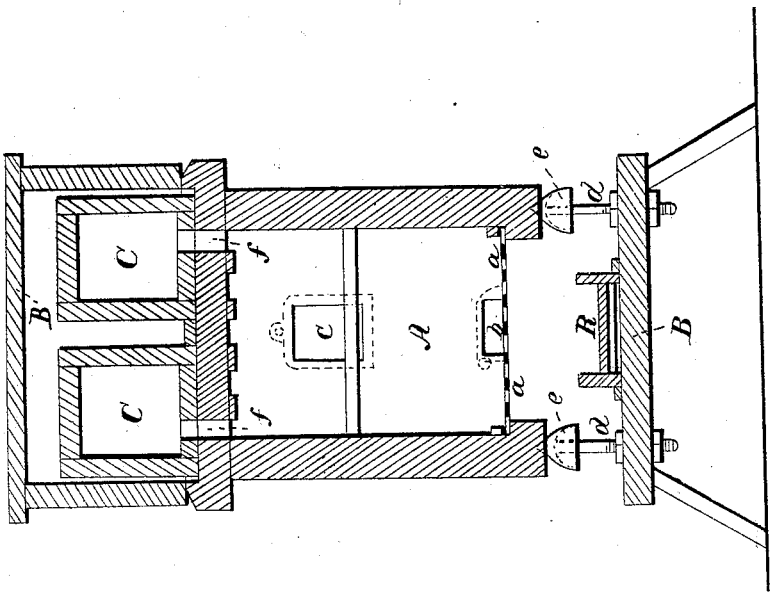

UNITED STATES PATENT OFFICE.

JAMES H. VALENTINE, OF SPARTA, ILLINOIS.

IMPROVEMENT IN BEE-HIVES.

Specification forming part of Letters Patent No. 35,791, dated July 1, 1862.

*To all whom it may concern:*

Be it known that I, JAMES H. VALENTINE, of Sparta, Randolph county, State of Illinois, have invented certain new and useful Improvements in Bee-Hives; and I do hereby declare the following to be a full, clear, and exact description of the same, reference being had to the annexed drawings, making part of this specification, in which—

Figure 1 is a top view of my said improved bee-hive with the cover and honey-boxes taken off, and Fig. 2 is a vertical section taken on the line A' A'.

The following description of my invention will enable any one skilled in the arts to which it appertains to make and use it.

Similar letters of reference represent similar parts in the different figures of the drawings referred to.

In the drawings, A represents the main hive, in the bottom of which is arranged a perforated bottom or plate, *a*, which projects somewhat in front of the hive, as shown in Fig. 1, for the bees to light on, the hole for the bees to enter at being above said plate, as shown by *b*. Said hole may be closed by a button, as shown in dotted lines. In the front of said hive a window is made, (shown by *c*,) which is also to be closed by a kind of sliding shutter. (Shown in dotted lines.)

A bench upon which the hive sets is shown by B, in the top whereof there are four pins, *d d*. Upon each of said pins there is an inverted glass bulb, *e e*, placed, made somewhat in the form of an inverted acorn. A common tumbler may be used in place of these bulbs when they cannot be had; but it is best to use them whenever they can be had, as no dirt can rest on them in which millers can breed moths. On the top of these bulbs the hive is set in the manner shown in Fig. 2, and on the top of the hive the honey-boxes C C are placed, communicating with the hive through the openings *f f*, and over the top of said boxes the cover D is placed, completing the hive. Now, when the bees are at work, the refuse falls down through the perforated bottom on the bench or in the trough R, where the millers are apt to breed moths. To keep these moths from climbing into the hive is the object of placing it on inverted glass bulbs, which accomplishes the object, the glass being so smooth that the moths cannot get up and down the sides.

I claim as my invention—

The arrangement of the pins *d d* and glass bulbs *e e*, in combination with the lower part of the hive and with the bench B, in the manner described, for the purpose specified.

JAMES H. VALENTINE.

Witnesses:
EDMUND HILL,
T. H. CAMPBELL.